(12) United States Patent
Hartland (10) Patent No.: US 10,830,115 B2
(45) Date of Patent: Nov. 10, 2020

(54) EXHAUST GAS TREATMENT SYSTEM AND METHOD

(71) Applicant: Jaguar Land Rover Limited, Coventry (GB)

(72) Inventor: Jonathan Hartland, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/487,626

(22) PCT Filed: Feb. 7, 2018

(86) PCT No.: PCT/EP2018/053068
§ 371 (c)(1),
(2) Date: Aug. 21, 2019

(87) PCT Pub. No.: WO2018/153673
PCT Pub. Date: Aug. 30, 2018

(65) Prior Publication Data
US 2020/0063627 A1    Feb. 27, 2020

(30) Foreign Application Priority Data
Feb. 24, 2017    (GB) .................................. 1703039.6

(51) Int. Cl.
*F01N 3/20*    (2006.01)
*B01D 53/94*    (2006.01)
(Continued)

(52) U.S. Cl.
CPC ......... *F01N 3/2013* (2013.01); *B01D 53/944* (2013.01); *B01D 53/9495* (2013.01);
(Continued)

(58) Field of Classification Search
CPC ....... F01N 3/2006–2046; F01N 3/2889; F01N 2240/16; F01N 2550/22; F01N 2610/10;
(Continued)

(56) References Cited

U.S. PATENT DOCUMENTS 3,766,536 A * 10/1973 Hile ..................... F01N 11/002
340/592
5,582,805 A * 12/1996 Yoshizaki ............. F01N 3/2026
422/174
(Continued)

FOREIGN PATENT DOCUMENTS

EP    2020488 A1    2/2009
GB    2273637 A    6/1994
(Continued)

OTHER PUBLICATIONS

International Search Report and Written Opinion of the International Searching Authority, International Application No. PCT/EP2018/053068, dated Apr. 23, 2018, 13 pp.
(Continued)

*Primary Examiner* — Mark A Laurenzi
*Assistant Examiner* — Mickey H France
(74) *Attorney, Agent, or Firm* — Reising Ethington P.C.

(57) ABSTRACT

A method and apparatus for heating an exhaust gas treatment system comprising a catalytic converter and a heat source, the catalytic converter having a first temperature above which the catalytic reaction is of high efficiency, whereby the heat source is controlled so as to generate a heated sub-volume of the catalyst which is in excess of the first temperature and propagates along the length of the catalytic converter such that at any one time the total conversion efficiency of catalytic converter is sufficient to remove a target amount of pollutants from the exhaust gas stream.

20 Claims, 9 Drawing Sheets

(51) Int. Cl.
*F01N 3/10* (2006.01)
*F01N 9/00* (2006.01)
*F01N 11/00* (2006.01)

(52) U.S. Cl.
CPC .......... *F01N 3/103* (2013.01); *F01N 3/2046* (2013.01); *F01N 9/00* (2013.01); *F01N 11/002* (2013.01); *F01N 2900/08* (2013.01); *F01N 2900/1404* (2013.01); *F01N 2900/1411* (2013.01); *F01N 2900/1602* (2013.01); *F01N 2900/1626* (2013.01)

(58) Field of Classification Search
CPC ......... F01N 2610/105; F01N 2610/107; F01N 2900/0602; F01N 2900/1631; F01N 2900/08; F01N 2900/1404; F01N 2900/1411; F01N 2900/1602; F01N 2900/1626; F01N 11/002; F01N 9/00
USPC ......... 60/284, 285, 286, 290, 294, 299, 300, 60/303, 320
See application file for complete search history.

(56) References Cited

U.S. PATENT DOCUMENTS

| | | | | |
|---|---|---|---|---|
| 5,585,073 A | * | 12/1996 | Swars | B01J 35/0033 422/174 |
| 5,839,273 A | | 11/1998 | Maus | |
| 9,493,153 B2 | * | 11/2016 | Hashimoto | F01N 3/2013 |
| 2004/0210378 A1 | | 10/2004 | Ellmer | |
| 2006/0266020 A1 | * | 11/2006 | Okamoto | F02D 41/401 60/284 |
| 2007/0028599 A1 | * | 2/2007 | Hartmann | F02D 41/0245 60/285 |
| 2008/0010972 A1 | * | 1/2008 | Ikeda | F01N 3/0253 60/274 |
| 2009/0301437 A1 | * | 12/2009 | Mizoguchi | F01N 3/101 123/443 |
| 2011/0277449 A1 | * | 11/2011 | Gonze | F01N 3/2026 60/274 |
| 2015/0240685 A1 | * | 8/2015 | Morishima | F01N 3/0871 60/274 |
| 2016/0251989 A1 | * | 9/2016 | Upadhyay | F01N 13/011 60/274 |

FOREIGN PATENT DOCUMENTS

| | | |
|---|---|---|
| KR | 10-1344123 B1 | 12/2013 |
| WO | 2006/026258 A1 | 3/2006 |

OTHER PUBLICATIONS

Patents Act 1977: Combined Search and Examination Report under Sections 17 and 18(3), UKIPO Application No. GB1703039.6, dated Aug. 7, 2017, 8 pp.

* cited by examiner

FIG. 14 ical field

EXHAUST GAS TREATMENT SYSTEM AND METHOD

RELATED APPLICATIONS

This application is a 35 U.S.C. § 371 national stage application of PCT Application No. PCT/EP2018/053068, filed on Feb. 7, 2018, which claims priority from Great Britain Patent Application No. 1703039.6, filed on Feb. 24, 2017, the contents of which are incorporated herein by reference in their entireties. The above-referenced PCT International Application was published in the English language as International Publication No. WO 2018/153673 A1 on Aug. 30, 2018.

TECHNICAL FIELD

The present disclosure relates to a catalytic converter heating scheme. Particularly, but not exclusively, the disclosure relates to optimising the operation of an electrical heater which provides heat to a catalytic converter so as to achieve a target emission level whilst minimising heat input. Aspects of the invention relate to an exhaust gas treatment system, a method for controlling a heater in an exhaust aftertreatment device and an apparatus for implementing this method.

BACKGROUND

Vehicle exhaust systems are configured to provide treatment of exhaust gases that are expelled from a vehicle, before the gases are released into the atmosphere. Vehicle exhaust systems typically comprise an exhaust manifold that is configured to collect exhaust gases from the engine and that directs the gases into downstream components of the exhaust system. In particular, the exhaust manifold may be connected to a turbocharger system, which, in turn, is connected to a hot end of the exhaust system.

It is well known that internal combustion engines can produce undesirable chemical species in their exhaust streams, and the use of catalysis technology has been found to be effective in reducing emissions of such species into the atmosphere. To this end, the hot end of the exhaust system typically comprises aftertreatment devices, such as a catalytic converter and associated piping. A catalytic converter typically includes a ceramic or metallic core having a honeycomb structure, and pores of the honeycomb structure are coated with catalysts. The catalysts can include precious metals such as platinum, palladium and rhodium, which increase the rate of reaction between oxygen from the atmosphere and carbon monoxide, oxides of nitrogen and hydrocarbons from the engine, converting the pollutants to relatively harmless compounds in the tail gas.

By virtue of the proximity of the catalytic converter to the internal combustion engine, heat remains in the exhaust gases, and is transferred to the catalytic converter, warming the catalytic converter and promoting the chemical reactions taking place therein. To increase the rate of reaction further, in recent years vehicle manufacturers have developed exhaust systems that allow for some additional electrical heating of the exhaust gases.

A known limitation of certain catalysts is the need to reach an elevated operating temperature, referred to herein as a light-off temperature, before they operate effectively. Below the light-off temperature, for example following a cold start of the internal combustion engine, the efficacy of the catalyst may be reduced. In order to comply with emissions legislations, it is desirable to heat the catalyst as quickly as possible to reduce so-called tail pipe emissions from the vehicle.

Of particular concern are NOx emissions from the engine, and which the engine exhaust after-treatment system is arranged to manage. Many countries apply restrictions to vehicle NOx emissions, and if the vehicle operates with a catalytic converter below the optimal temperature for a prolonged period it is possible that the emissions may exceed defined limits in those countries. Other examples of undesirable chemical species are hydrocarbons.

As engines become more efficient, and exhaust temperature reduce in low speed/load driving conditions, the risk of the catalytic converter dropping to a temperature at which its conversion efficiency is insufficient increases, resulting in increased pollutant emissions from the engine exhaust.

It is known to use electrical heat to boost the temperature of a catalytic converter in order to maintain high conversion efficiency, however the power requirements of the heater coupled with the loss of energy to inefficiencies in conversion from fuel energy, to heat, to mechanical power by the engine, and then through various electrical power management systems and finally back to heat in the catalyst mean that the heating has a high power cost and any overall gains can be marginal.

It is an aim of the present invention to provide an exhaust gas treatment system, method for controlling a heater in an exhaust aftertreatment device and apparatus for implementing this method.

SUMMARY OF THE INVENTION

Aspects and embodiments of the invention provide a system and method as claimed in the appended claims.

According to an aspect of the invention, there is provided an exhaust gas treatment system for converting removing pollutants in from an exhaust gas stream of a combustion engine to form a converted gas stream, the system comprising a heat source for increasing the temperature of the catalytic converter, a catalytic converter with a gas inlet for the exhaust gas stream and a gas outlet for the converted gas stream, a catalytic reaction of the catalytic converter having a higher efficiency above a first temperature than below a second temperature which is lower than the first temperature, a heat source for increasing the temperature of the catalytic converter, a control unit for controlling the heat source such that a sub-volume of the catalytic converter is above the first temperature, thereby creating a hot volume having a higher conversion efficiency than a remaining cooler volume of the catalytic converter. The control unit is configured to: in a first phase of a heating cycle, control the heat source such that the hot volume extends from the inlet of the catalytic converter in the direction of the exhaust gas stream, and in a second phase of the heating cycle, control the heat source such that the temperature of the inlet of the catalytic converter is reduced below the second temperature, allowing the hot volume to travel towards the outlet of the catalytic converter and a cooler volume to extend from the inlet of the catalytic converter in the direction of the exhaust gas stream. The first and second phase may be timed such that as the hot volume travels towards the outlet of the catalytic converter, the total conversion efficiency of the hot and cold volume of the catalytic converter is such that the exhaust gas stream is converted to a converted gas stream with a required reduction of pollutants.

According to an aspect of the invention there is provided an exhaust gas treatment system for converting pollutants in an exhaust gas stream of a combustion engine to a converted gas stream, the system comprising: a heat source for increasing the temperature of the catalytic converter; a catalytic converter with a gas inlet for the exhaust gas stream and a gas outlet for the converted gas stream, the catalytic converter having a first temperature above which the catalytic reaction is of high efficiency and a second temperature which is lower than the first temperature; a control unit for controlling the heat source such that a sub-volume of the catalytic converter is above the first temperature, thereby creating a hot volume having a higher conversion efficiency than a remaining cold volume of the catalytic converter; the control unit being configured to: in a first phase of a heating cycle, control the heat source such that the hot volume extends from the inlet of the catalytic converter in the direction of the exhaust gas stream; and in a second phase of the heating cycle, control the heat source such that the temperature of the inlet of the catalytic converter is reduced below the second temperature, whereby the hot volume travels towards the outlet of the catalytic converter and a cooler volume or cold volume to extend from the inlet of the catalytic converter in the direction of the exhaust gas stream, and wherein the first and second phase are timed such that as the hot volume travels towards the outlet of the catalytic converter, the total conversion efficiency of the hot and cold volume of the catalytic converter is such that the exhaust gas stream is fully converted to a converted gas stream.

By providing only enough heat to create hot volume having sufficient temperature and volume so as to fully convert the incoming exhaust gas stream to a converted gas stream, energy that would otherwise be wasted heating the entire catalytic converter to a given temperature is saved, increasing the overall efficiency of the engine system.

Optionally, the heating cycle is repeated. By timing the cycle to repeat, a heating pulse can set up to create new hot volume as the previous hot volume finally dissipates, thereby maintaining the overall desired conversion efficiency of the catalytic converter without having to provide constant heat.

Optionally, the heat source is an electrical heater. Electrical heaters are known to be used and employing such technology allows the invention to be implemented in existing engines with a minimum of modification. In an example of a further heater type the heat source may comprise a microwave heater wherein the microwave heater may heat a target in the exhaust gas stream, said target may be a portion of the catalytic converter, said portion may be the front face of the catalytic converter. The skilled person would understand that any form of heat source that is secondary to the heat generated by the engine of the vehicle; although in some conditions, the engine may be fuelled to run hotter than in a normal running condition for the purposes of heating the exhaust system.

Optionally, a plurality of hot volumes exists along the length of the catalytic converter at any one time, separated by intervening cooler volumes or cold volumes. As it is the total conversion efficiency of the catalytic converter that determines the ability to convert the exhaust gas stream, multiple hot zones of identical or different temperatures and conversion efficiencies can be set up along the length of the catalytic converter should the thermal environment hamper the creation or propagation of a single hot volume of sufficient temperature or volume.

Optionally, the converted gas stream is 90% free from pollutants. This enables the exhaust gas treatment system to satisfy and exceed a number of exhaust emissions targets.

Optionally, the first temperature is equal to or greater than the light-off temperature of the catalytic converter. By heating the catalytic converter above the light-off temperature, the necessary reactions can take place to remove pollutants from the exhaust gas stream.

Optionally, the second temperature is equal to or less than the light-out temperature of the catalyst. By keeping the cold volume of the catalyst below the light-out temperature, only the hot sub-volume need to be actively heated to provide the required conversion efficiency, thereby reducing the necessary heat energy and allowing for inputted energy to be concentrated for effect.

The skilled person understands that the light-off temperature is the temperature at which the catalyst is considered operational as the gas temperature increases and the light-out temperature is the temperature at which the catalyst is considered to stop being operational as the gas temperature falls. This temperature can in some cases be different, the light-out temperature being lower than the light-off temperature, due to the hysteresis effect within the catalyst described below.

Optionally, the controller calculates the timing of the first and second phase taking into account the heat generated by an exothermic conversion reaction of the exhaust gas stream into the converted gas stream, thereby enabling the heat input to be reduced.

Some conversion reactions are exothermic, producing heat which can be absorbed by the local hot volume of the catalytic converter thereby preventing the hot zone from dissipating as quickly as would otherwise be the case. By taking account of this fact, the controller can shorten the first phase so as to provide less initial heat to the hot volume and/or delay the next cycle given the potential increase in the lifetime of the first hot volume.

Optionally, the controller calculates the timing of the first and second phase taking into account the hysteresis in the relationship between conversion efficiency and temperature of the catalytic converter, thereby enabling the heat input to be reduced.

The relationship between conversion efficiency and temperature of the catalytic converter is hysteretic such that the conversion efficiency as the catalytic converter cools does not decrease as rapidly as it increases when the catalytic converter is heated. Accordingly, the initial heat input and subsequent temperature of the hot volume can be lowered in the knowledge that the conversion efficiency will remain high for longer as the hot volume cools down in the second phase of the heating cycle.

Alternatively, the controller uses pre-defined values for the duration of the first phase, the temperature level to be achieved in the first phase, the duration of the second phase, and the temperature level to be achieved in the second phase.

These values can be based on experimental studies or pre-calibration tests and stored in a look up table. They may further be tuned for the particular exhaust gas treatment system in use.

Optionally, the pre-defined values are determined as a function of at least the temperature of the exhaust gas, or the actual power output of the combustion engine.

Optionally, the predefined values are determined based on one or more of the temperature of the exhaust gas, the temperature of the catalytic converter and the flow rate of the exhaust gas through the catalytic converter.

By actively monitoring the above variables the controller can provide the correct level of heat for the correct time so as to provide the required total conversion efficiency in the current operating conditions and thermal environment.

Optionally, the predefined values are determined based on an expected change in the power output of the combustion engine.

Optionally, the expected change of the power output of the combustion engine is derived from position data (for example GPS) or advanced driver assistance systems (ADAS).

By pre-empting changes in the engine performance and/or driving environment, the controller can predict the temperature of the exhaust gas and therefore determine the level of additional heating of the catalytic converter required, if any. Further, this ability to predict the required heat output allows the controller more time to achieve the desired output, improving the response and overall performance of the exhaust gas treatment system.

Optionally, the electrical heater is powered using electrical assistance from a hybrid electric vehicle. By using electricity from on-board batteries, the heat source does not need to be powered by energy produced by the engine, which must first be extracted from the fuel, turned into heat, turned into mechanical power and then back into electricity. Accordingly the overall efficiency of the system is improved.

In the case of a PHEV, as the effective volume of the catalyst is smaller than the total volume, the electric motor could temporarily be used to limit the load on the engine and hence the flow of exhaust gasses through the catalyst while the electrical heating system responds to any increased demand on the catalyst system (for example during fast acceleration of the vehicle). In this condition, after the hot zone is large enough to convert the exhaust gasses, the temporary assistance from the electric motor can be reduced.

According to a further aspect of the present invention, there is provided a method of heating a catalytic converter having a gas inlet for an exhaust gas stream and a gas outlet for a converted gas stream formed by removing pollutants from the exhaust gas stream, the method comprising: in a first phase, supplying heat at a first level for a first amount of time to a catalytic converter such that a sub-volume of the catalytic converter is heated above a first temperature above which the catalytic reaction is of a higher efficiency than below a second temperature which is lower than the first temperature, the sub-volume extending from the inlet of the catalytic converter in the direction of the exhaust gas stream thereby defining a hot volume having a higher conversion efficiency than a remaining cooler volume of the catalytic converter; and in a second phase, supplying heat at a second level for a second amount of time to the catalytic converter such that the temperature of the inlet of the catalytic converter is reduced below the second temperature, so as to allow the hot volume to travel towards the outlet of the catalytic converter and a cooler volume to extend from the inlet of the catalytic converter in the direction of the exhaust gas stream. The first and second phase are timed such that as the hot volume travels towards the outlet of the catalytic converter, the total conversion efficiency of the hot and cold volume of the catalytic converter is such that the exhaust gas stream is converted to a converted gas stream with a required reduction of pollutants.

According to a further aspect of the invention there is provided a method of heating a catalytic converter having a gas inlet for an exhaust gas stream and a gas outlet for the converted gas stream, the method comprising: in a first phase, supplying heat at a first level for a first amount of time to a catalytic converter such that a sub-volume of the catalytic converter is heated above a first temperature at which point the catalytic reaction is of high efficiency, the sub-volume extending from the inlet of the catalytic converter in the direction of the exhaust gas stream thereby defining a hot volume having a higher conversion efficiency than a remaining cold volume of the catalytic converter; and in a second phase, supplying heat at a second level for a second amount of time to the catalytic converter such that the temperature of the inlet of the catalytic converter is reduced below a second temperature which is lower than the first temperature, whereby the hot volume travels towards the outlet of the catalytic converter, and a cooler or cold volume to extend from the inlet of the catalytic converter in the direction of the exhaust gas stream and wherein the first and second phase are timed such that as the hot volume travels towards the outlet of the catalytic converter, the total conversion efficiency of the hot and cold volume of the catalytic converter is such that the exhaust gas stream is fully converted to a converted gas stream.

Other aspects of the invention will be apparent from the appended claim set.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 6A-I are a group of graphs which depict the temperature, conversion efficiency, and exhaust gas stream pollutant level as a function of distance along the length of the catalytic converter for different heating schemes.

FIGS. 11A-C are a set of graphs showing the effect of 885 W heating at various pulse widths on the diesel oxygen catalyst's temperature profiles: A) Pulse Width 10 s, B) Pulse Width 20 s, C) Pulse Width 30 s;

DETAILED DESCRIPTION

In an aspect of the invention, a method is carried out in an exhaust gas treatment system, otherwise known as an aftertreatment system installed in a vehicle, such as a motor vehicle. Whilst the following embodiments are described with reference to a motor vehicle, the disclosure and the concepts described herein are applicable to other engines producing an exhaust gas stream, for example those installed on other forms of vehicle or generator systems.

Particularly, but not exclusively, the disclosure relates to an exhaust gas treatment system within a motor vehicle which utilises a catalytic convertor to process exhaust gasses. The examples can be, but are not limited to, cars, buses, lorries, trucks, excavators and construction and farming or other commercial vehicles.

Figure 1:
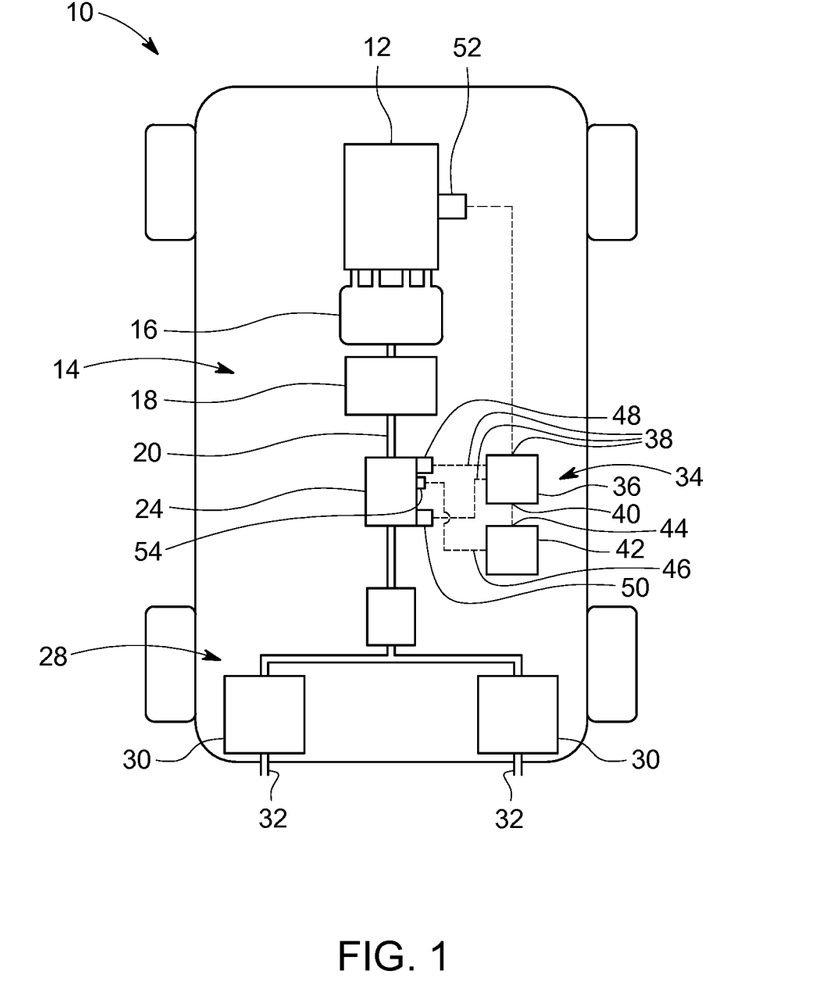
FIG. 1 is a schematic representation of a vehicle having an exhaust system.

FIG. 1 shows a vehicle 10 having an engine 12, an exhaust manifold 16, a turbocharger 18, exhaust transfer pipe 20, rear end exhaust arrangement 28 having muffler boxes 30 and tail pipes 32, a catalytic converter system 34, the catalytic converter system 34 comprising the catalytic converter 24 of the exhaust system 14, an Engine Control Unit (ECU) 36 having an input 38 and an output 40, a Heat Control Unit (HCU) 42 having an input 44 and an output 46, a plurality of sensors 48, 50, 52 and at least one heat source, provided by suitable heating devices 54.

Figure 2:
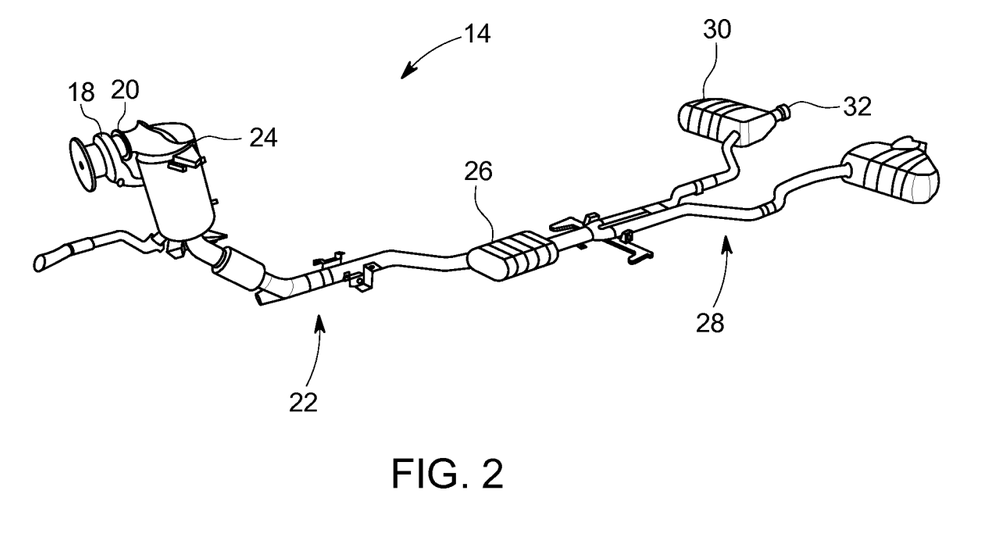
FIG. 2 is a schematic representation of an exhaust system.

The exhaust system is shown in more detail in FIG. 2.

Figure 3:
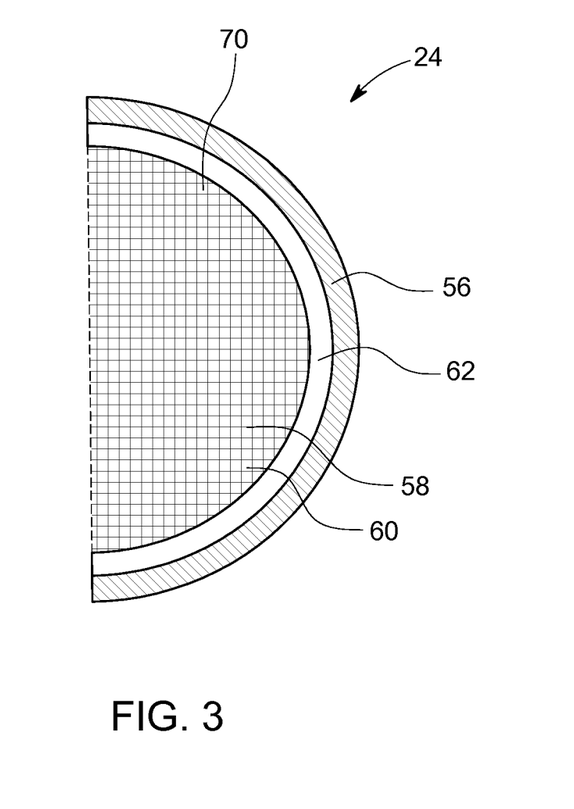
FIG. 3 is a schematic representation of the cross section of a catalytic converter.

As shown in FIG. 3, the catalytic converter 24 includes a sealed outer case 56, or housing, a substrate 58, at least one catalyst 60 and a mounting mat 62. The outer case 56 itself defines an interior volume within which the mounting mat 62 and substrate 58 are provided. The mounting mat 62 is formed from ceramic fibres and is positioned intermediate the outer case 56 and the substrate 58, such that the outer case 56, the mounting mat 62 and the substrate 58 are arranged in concentric relation.

The outer case 56 may be manufactured from steel and is hollow and generally cylindrical in shape, encapsulating the substrate 58, which fills a major portion of the interior space. A central portion of the outer case 56 forms a main body 64, which tapers symmetrically at upstream 241 and downstream 242 ends of the outer case 56 to form substantially identical cylindrical forward and rearward connecting ends 66, 68, each having a smaller diameter than the main body 64.

The substrate 58 may be manufactured from any suitable material, such as a ceramic or steel, and takes the form of a honeycomb structure having a plurality of pores 70. It should be appreciated that the substrate 58 could comprise a multi-channelled structure taking any number of alternative forms, and that the invention is not limited to a substrate 58 taking the form of a honeycomb structure. Typically, the substrate 58 is a catalytic substrate 58 and the pores 70 may be coated with a suitable catalyst 60, such as platinum, palladium and/or rhodium, which increases the conversion rate of carbon monoxide, oxides of nitrogen and hydrocarbons in the exhaust gases to harmless compounds for dispelling into the atmosphere through the tail pipes 32 (shown in FIG. 1) of the vehicle 10.

It is to be understood that the catalysts 60 identified are merely examples, and that any suitable addition or alternative may be used. The mounting mat 62 intermediate the outer case 56 and substrate 58 is positioned so as to accommodate the different thermal coefficients of expansion of the outer case 56 and substrate 58.

Figure 4:
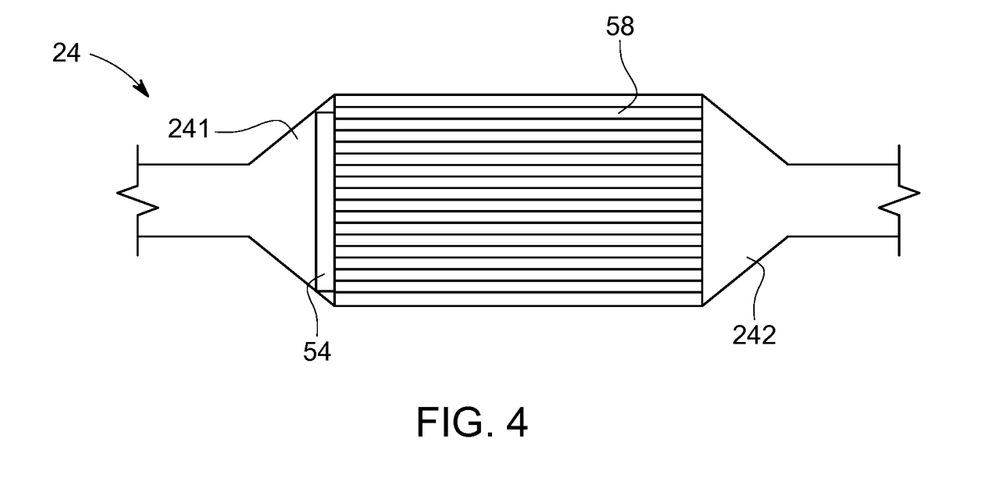
FIG. 4 is a schematic representation of a catalytic converter.

FIG. 4 shows the catalytic converter substrate 58 in proximity to the heater 54. In an embodiment, the heater 54 is located in the upstream end 241 of the casing 56 so as to heat the exhaust gas stream before it flows through the catalytic converter substrate 58, thereby indirectly heating the substrate 58. The skilled person would understand that the exact position of the heater 54 and its arrangement relative to the substrate 58 is not limited to that shown in FIG. 4. Rather any suitable arrangement may be used which enables heat to be transferred from the heater 24 to a portion of the substrate 58, such as direct heating means.

Equally, the heater 54 may be an electrical heater or any other suitable heating means capable of performing the required action.

The catalytic converter system comprises a heat control unit (HCU) 42 and an engine control unit (ECU) 36. In an embodiment, the ECU 36 has an input configured to receive sensor data and an output configured to transmit a signal to the HCU 42 in dependence on the sensor data. The HCU 42 is configured to command a temperature change of the heating device in dependence on the signal transmitted from the ECU 36. The HCU 42 is therefore configured to command a temperature change of the heating device 24 in dependence on the sensor data. In an embodiment, this sensor data relates to one or more of the exhaust gas temperature, engine load, engine power output, expected change in the power output of the engine, position data (for example GPS), ADAS data, the temperature of the catalytic converter and the flow rate of the exhaust gas through the catalytic converter 24.

In operation, in a first phase of a heating cycle, the HCU 42 receives data from ECU 36 which indicates the catalytic converter substrate 58 requires heating in order to provide the necessary conversion efficiency for the present engine conditions and exhaust gas stream pollutant level. In an embodiment, the data may represent current conditions and/or predicted conditions, the latter enabling the catalytic converter substrate 58 to pre-emptively reach the required temperature. In an embodiment, the sensor data is used to index a lookup table for the corresponding required heater output for the given conditions and the particular catalytic converter 24 being used. In an embodiment, the sensor data is used to calculate the required heater output using a computational model.

The heater 54 is activated and the temperature of the substrate 58 begins to increase towards a first target temperature. Given the finite time it takes for the thermal energy to dissipate evenly throughout the substrate 58, the portion of the substrate 58 in closest proximity to the heater 24 is heated above the rest of the substrate 58, thereby creating a heated sub-volume of the substrate 58, otherwise referred to as a hot volume or hot zone, having a front edge towards the downstream end 242 of the catalytic converter 24 and a back edge at the upstream end 241 of the catalytic converter 24. This hot volume will have a higher temperature and thus a higher conversion efficiency than the remaining unheated, or cold volume, of the substrate. In an embodiment, the hot volume of the substrate is above the light-off temperature of the catalytic converter such that the conversion reactions are initiated in the hot volume only.

Figure 6:
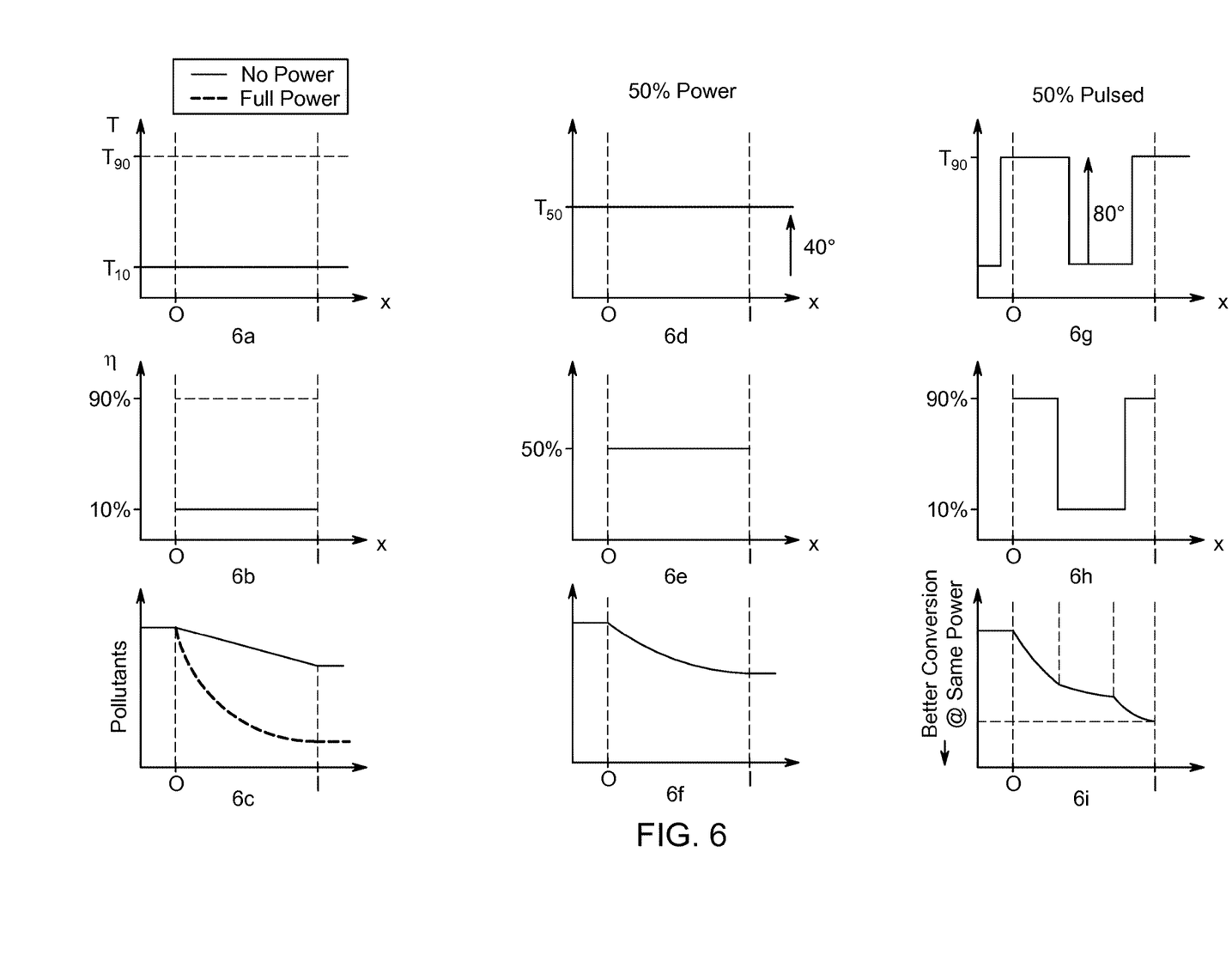

If left for a sufficient length of time, the hot volume would spread out along the entire length of the substrate 58 as the front edge advances or otherwise propagates towards the downstream end 242 of the converter 24, as shown in FIGS. 6A-C. Before this can occur, the output from the heater 54 is reduced such that the temperature of the substrate sub-volume in closest proximity to the heater 54 is lowered below a second temperature, in a second phase of the heating cycle. In an embodiment, this second temperature is below the light-out temperature of the catalytic converter 24. As a result, the back edge of the hot volume moves in the downstream direction towards the downstream end 242 along with the front edge. Thus the hot volume travels as a distinct heat pulse along the entire length of the catalytic converter substrate 58 as shown in FIGS. 6G-6I, where at any given time, the hot volume is the active portion of the catalyst, performing the catalytic conversion reaction.

In an alternative embodiment, the remaining cold volume of the catalyst is also active, with the second temperature being above the light-off temperature, the hot volume being at a high temperature still having an associated higher conversion efficiency.

The output of the heater 54 in the first phase is controlled such that the temperature and volume of the hot volume is sufficient to maintain a required level of total conversion efficiency across the catalytic converter as a whole as the hot volume propagates through the substrate 58. The temperature of the hot volume is a function of the heater output power in conjunction with the length of the first phase of the heating cycle. The extent of the hot volume, or in other words, the extent to which it spreads towards the downstream end 242 of the substrate 58 during the first cycle is controlled by the timing between the first and second cycles.

Once the hot volume reaches the end of the substrate 58, the heater is reactivated and a second hot volume is created which subsequently advances or otherwise propagates towards the downstream end 242 of the converter 24 as described above, as shown in FIG. 6G. Accordingly, the total effective conversion efficiency of the catalytic converter is maintained at level sufficient to convert the incoming exhaust gas stream into a converted gas stream with the required reduction in pollutants, as shown in FIG. 6I. In an embodiment, only a single cycle is required.

Figure 5:
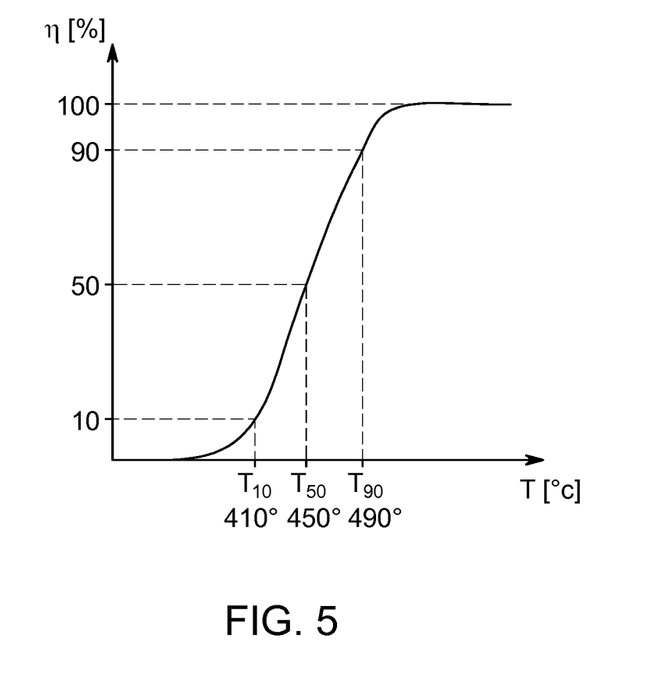
FIG. 5 is a graph showing the general relationship between the conversion efficiency and temperature of the catalytic converter.

Due to the highly non-linear relationship between catalytic conversion efficiency and temperature (as depicted in FIG. 5), the above detailed heating scheme is more efficient than maintaining the entire catalyst a temperature necessary to achieve the desired total conversion efficiency, as demonstrated by a comparison between FIGS. 6F and 6I.

Operating the catalytic converter 24 at a varying temperature where waves of heat are pulsed through the catalyst and optionally along the length of the catalyst substrate 58, such that the hot volume is active with a high conversion efficiency and the surrounding cold volume has a lower conversion efficiency or is dormant (having a temperature such that the conversion efficiency is lower or zero) is equivalent to a highly efficient catalyst of a smaller volume, rather than a full size catalyst with lower efficiency.

As FIG. 5 shows, running a catalytic converter at a temperature of, for example, 490° C. has a much higher conversion efficiency than the same converter running at 410° C. As a consequence, a small sub-volume of the catalytic converter at a high temperature can have a greater conversion efficiency than a catalytic converter having a larger volume at a lower temperature By pulsing the output of the heater 54 to create a small hot volume as described, a higher gaseous pollutant conversion efficiency is achieved than if the whole catalyst were maintained at the temperature that would otherwise be achieved with continuous heating at the same electrical power level, as shown in FIGS. 6D-6I.

By repeating the cycle to maintain the thermal wave through the catalyst and ensuring that sufficient catalyst volume is maintained at high conversion efficiency, the average catalyst heat input required to maintain high conversion efficiency can be reduced. The necessary heat outputs and timing of the first and second phases can be determined by experiment, an example of which is given below.

FIGS. 7 to 14 relate to the development of a particular heat control strategy for an electrically heated catalyst (EHC) in a test environment by way of example only. In this section, this strategy is referred to as pulsating EHC (P-EHC) given that the electrical heating power turns on and off with a defined pulse width (PW) over the catalyst's heating period. In this study, the P-EHC's heating efficiency was evaluated based on the measured performance of a diesel oxide catalyst (DOC) when comparing the P-EHC to the conventional, non-pulsed EHC with similar electrical energy consumption. It is understood that conditional setup and physical dimensions of the apparatus demonstrated will have an effect on any temperatures, power, flow rates and time frames noted hereafter. For example, should the engine be more efficient it may provide less heat to the exhaust gas; or, should the catalytic converter be of different dimensions the power necessary would vary accordingly. By simple modification and experimentation, the following could be used to instruct a skilled person to provide the technical effect of the invention given different conditional setup and physical dimensions of the apparatus.

Figure 7:
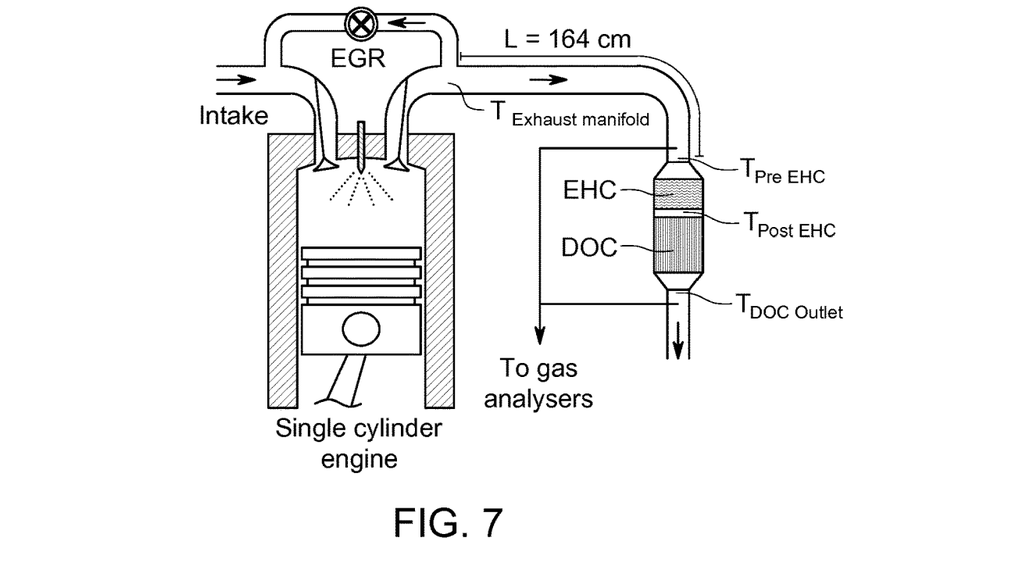
FIG. 7 is schematic representation of the experimental set up used to determine the parameters of the first and second phase in a test engine.

For the experimental set up, a single cylinder diesel engine was used having an 84 mm bore, 90 mm stroke, a 160 mm connecting rod length, a displacement volume of 499 cc, compression ratio of 16.1:1, a maximum injection pressure of 1500 bar with a Euro 5 emissions standard. The four-stroke engine is naturally aspirated, water cooled, EGR equipped and utilises a common rail direct fuel injection. An alternating current (AC) electric dynamometer was used to motor and load the engine. The engine was fuelled with ultra-low sulphur diesel (ULSD). The setup is shown in FIG. 7.

In-cylinder pressure was recorded using an AVL GH13P pressure transducer mounted in the cylinder head and its signal was amplified by an AVL FlexiFEM 2P2 amplifier. The crank shaft position was measured by a digital shaft encoder producing 360 pulses per revolution. The pressure and crank shaft position data was combined to create an in-cylinder pressure trace.

The temperature at different points was recorded by using k-type thermocouples and a Pico Technology TC-08 thermocouple data logger. An airflow meter was used to measure the engine intake air flow.

The engine operating parameters, including the injection strategy, were monitored and controlled by a data acquisition and/or control device. The programme analyses the engine's indicated mean effective pressure (IMEP) for each cycle by considering Equation 3-1. To ensure combustion stability and minimizing cyclic variability, the coefficient of variation (COV) of the IMEP for 100 cycles was monitored and kept below 4% during the testing procedure.

To ensure consistency, the engine was warmed up for approximately one hour prior to testing and the test cell's atmospheric conditions were monitored. The engine operating condition of 1200 RPM and 2 bar IMEP were selected as the engine rotational speed and load respectively to reproduce low-load driving conditions. The common rail fuel injection pressure was set at 550 bar. The pilot fuel injection was set to start at 15° bTDC with the duration of 0.150 ms; whereas the main injection started at 3° bTDC with the duration of 0.446 ms. In the cases with fuel post-injection, it started at either 25°, 40° or 55° aTDC as indicated with the duration of 0.100 ms.

The exhaust aftertreatment system consisted of an electrically heated catalyst (EHC) and a diesel oxidation catalyst (DOC). The size of the aftertreatment reactor was selected to maintain comparable gas hourly space velocity (GHSV) to commercial multi-cylinder engines exhaust aftertreatment systems.

The DOC has dimensions of 58 mm in diameter and 101 mm in length. The ceramic catalyst substrate was made of cordierite with the cell density of 600 cpsi and wall thickness of 3 Mil. The catalyst was coated with the platinum group metals (PGM) loading of 100 g/ft$^3$ and formulation ratio of 2:1:0 for platinum, palladium and rhodium respectively. Zeolite was also incorporated into the catalyst coating for improved low-temperature hydrocarbon adsorption and oxidation. The DOC was hydro-thermally aged at 700° C. for 16 hours prior to testing.

The EHC has dimensions of 63 mm in diameter and 60 mm in length. It is made of a metallic substrate with 130 cpsi cell density and wall thickness of 2 Mil. The heating element has a resistance of 0.08Ω with a maximum operating voltage of 12 V. In this study, the EHC was catalytically uncoated and it was essentially used as an exhaust gas heater to investigate the heating effect individually. The EHC was powered using a TDK-Lambda GEN12.5-120 power supply which can deliver variable voltage up to 12.5 V and variable current up to 120 A.

At the 1200 RPM and 2 bar IMEP engine operating condition, the exhaust flow rate was measured at 241 L/min which corresponds to the DOC's gas hourly space velocity of 49,900 h$^{-1}$. The exhaust gas travels from the exhaust manifold, where there is a thermocouple to measure the engine-out exhaust gas temperature and passes through 164 cm of pipework to reach the main reactor. This configuration helps to cool down the exhaust gas considerably and provides a more challenging environment for the emissions reduction in the aftertreatment system. Three thermocouples were integrated into the reactor to measure the temperature before the EHC, after the EHC and after the DOC. Two heated exhaust gas sampling lines were used to direct the exhaust gas to the emissions analysers before and after the reactor. The sampling lines temperature was kept at 179° C. to avoid hydrocarbon condensation and nucleation.

An MKS MultiGas 2030 Fourier Transform Infrared (FTIR) spectroscopy analyser was used for the analysis of the engine's gaseous emissions. The FTIR spectroscopy technique distinguishes different gaseous species based on their light absorption characteristics. The real-time concentrations of the emissions were recorded with the frequency of one hertz and the data was averaged in steady-state conditions. The following species concentration were analysed: carbon dioxide ($CO_2$), carbon monoxide (CO), nitrogen oxides (NO and $NO_2$), total hydrocarbon (THC), diesel (heavy hydrocarbons), methane ($CH_4$), ethane ($C_2H_6$), ethylene ($C_2H_4$), acetylene ($C_2H_2$), propane ($C_3H_8$), propylene ($C_3H_6$), formaldehyde ($CH_2O$) and water ($H_2O$).

Figure 8:
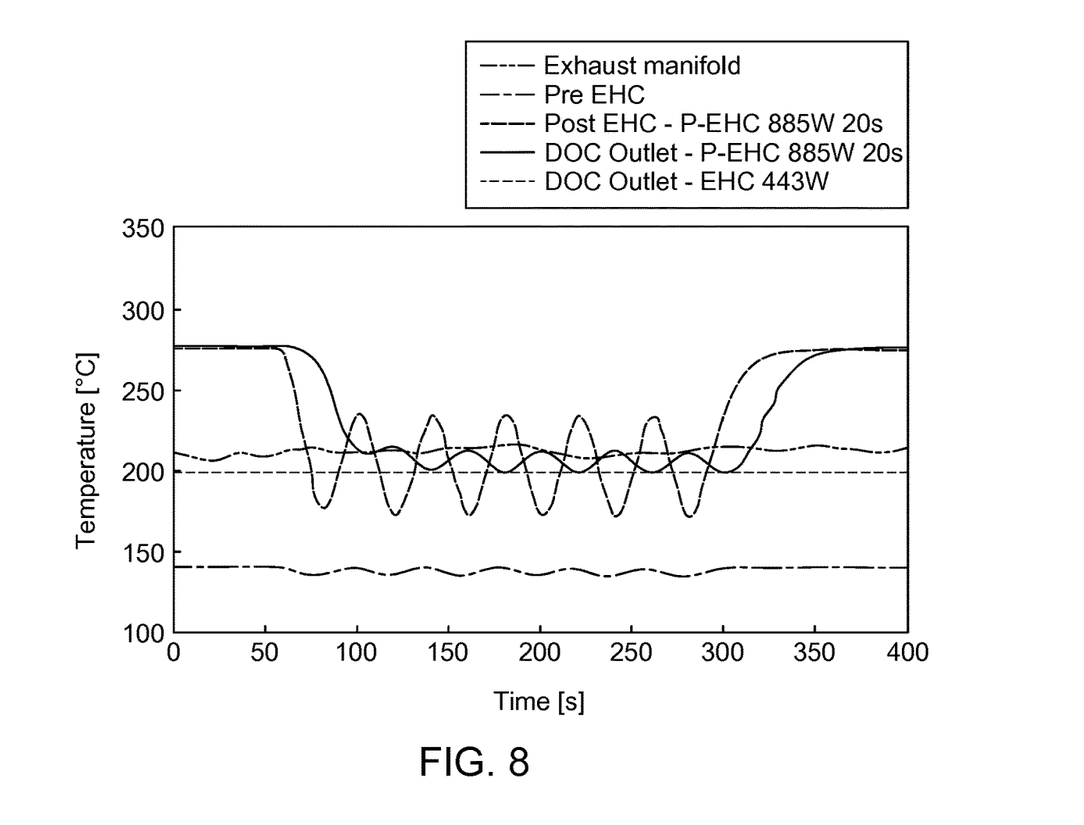
FIG. 8 is a graph showing the effect of the heating cycle on the diesel oxygen catalyst's temperature profiles.

Following data acquisition, the pulsating EHC with a pulse width of 20 seconds (20 seconds on followed by 20 seconds off) and electrical power of 885 W was compared to the EHC at 443 W as shown in FIG. 8. The DOC's inlet temperature (post EHC) tends to fluctuate from 173° C. to 234° C. as the electrical heating turns on and off in the P-EHC case. This results in fluctuations in the DOC's outlet temperature with reduced amplitude (from 199° C. to 212° C.) mainly due to the catalyst's thermal inertia. The average DOC's outlet temperature using the pulsating strategy is approximately 7° C. higher over the heating period compared to the EHC 443W case. Considering that a comparable amount of electrical energy was delivered to the catalyst in both cases, this temperature increase can be explained by promoted exothermic oxidation reactions in the pulsating catalyst heating case.

Figure 9:
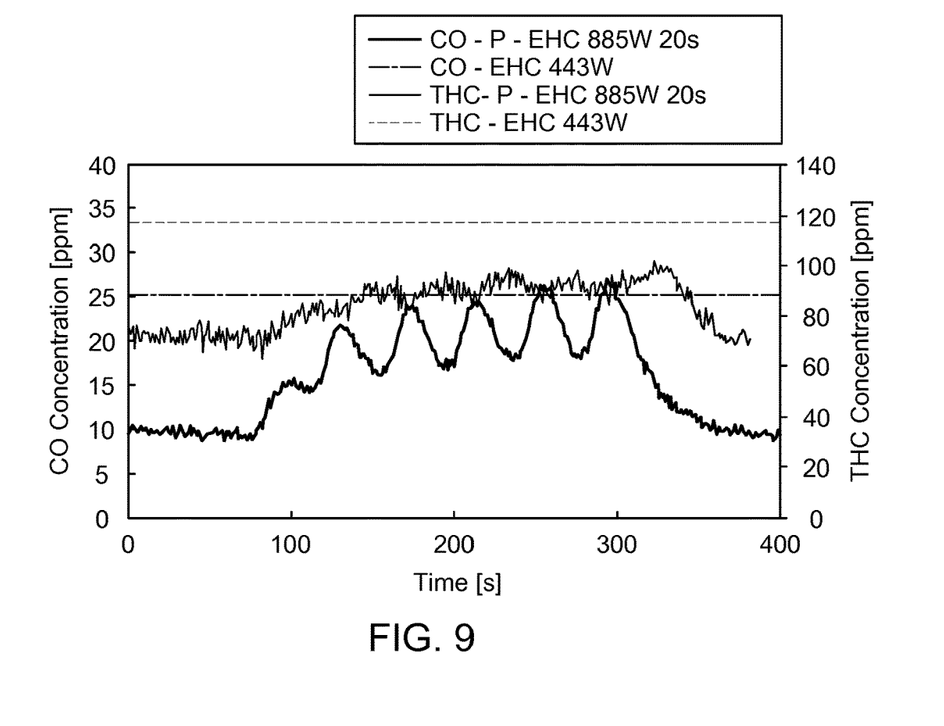
FIG. 9 is a graph showing the effect of the heating cycle on the CO and THC emissions at the diesel oxygen catalyst's outlet.
Figure 10:
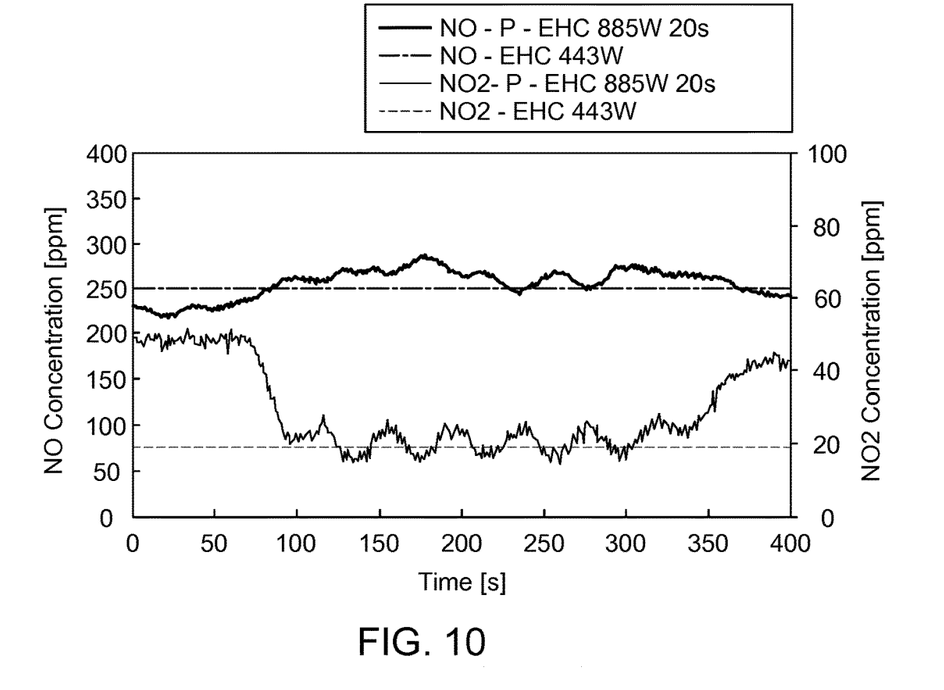
FIG. 10 is a graph showing the effect of the heating cycle on the NO and NO2 Emissions at the diesel oxygen catalyst's outlet.
Figure 11:
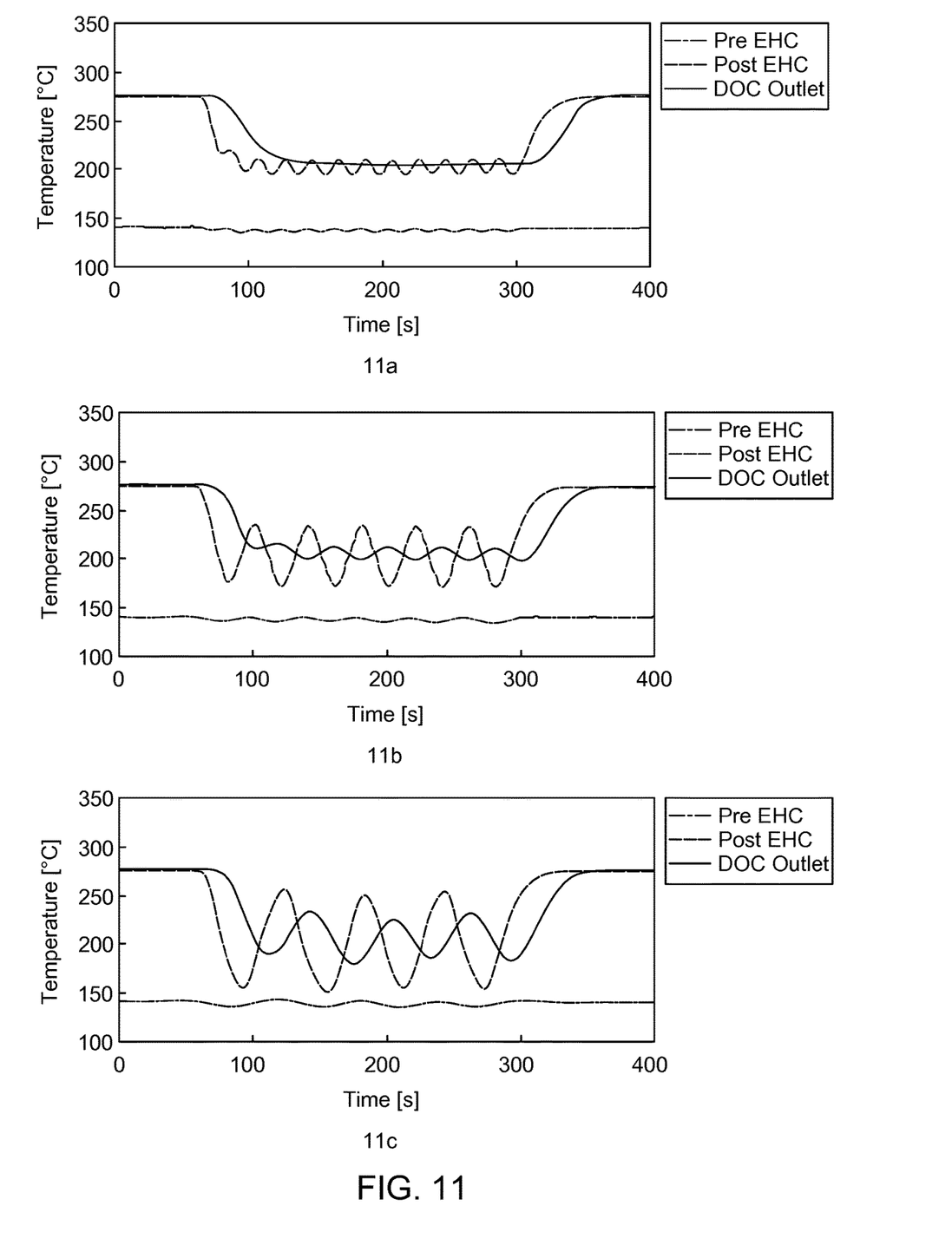

As shown in FIG. 9, carbon monoxide (CO) and total hydrocarbon (THC) emissions at the DOC's outlet can be reduced by approximately 18% and 24% respectively using the pulsating heating strategy with respect to comparable steady electrical catalyst heating. The results indicate that CO emissions are more sensitive to temperature fluctuations while THC emissions proved to be stable over the pulsating heating period. This can be caused by the hydrocarbon storage capability of the zeolite in the catalyst coating. FIG. 10 shows that the pulsating heating has a relatively insignificant effect on the NO and NO2 emissions.

Figure 12:
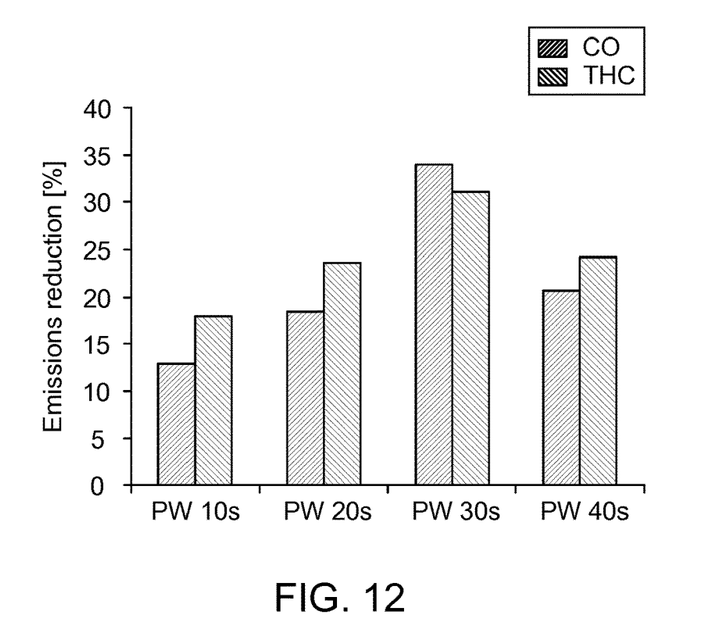
FIG. 12 is a graph showing the effect of different phase (885 W) timings on the CO and THC emissions reduction compared to a control case.
Figure 13:
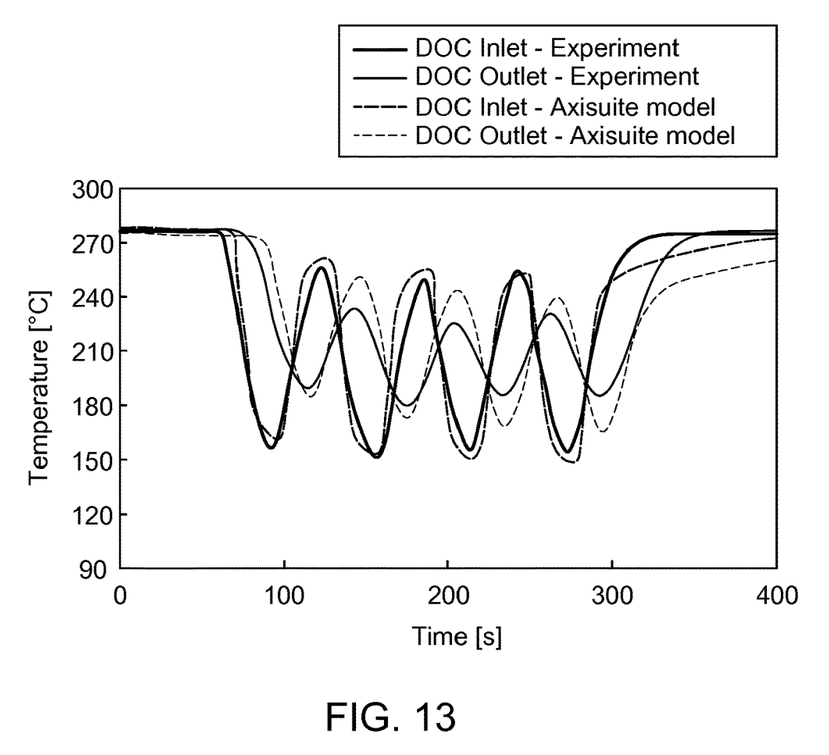
FIG. 13 is a graph depicting the calibration and validation of an Axisuite model based on an experimental heating cycle (885 W Power and a 30 pulse width between the first and second phase)

The effect of the heating pulse width on the DOC's temperature profiles was investigated experimentally and is shown in FIG. 12. The 885 W of Pulsating heating with a pulse width of 10 seconds made the DOC's inlet temperature fluctuate in the range of 197° C. to 205° C. However the DOC's outlet temperature remained stable at approximately 204° C.; which is 5° C. higher compared to steady electrical catalyst heating with similar electrical energy consumption. In this case, CO and THC emissions tended to reduce by approximately 13% and 18% respectively, as shown in FIG. 13.

Results show that increasing the heating pulse width to 30 seconds can lead to extended temperature fluctuations at the DOC's inlet in the range of 154° C. to 255° C. Consequently the DOC's outlet temperature varies from 183° C. to 228° C. over the pulsating heating period. Among the studied cases, the pulse width of 30 seconds showed the highest emissions reduction at the DOC's outlet with approximately a 34% and 31% decrease in the CO and THC emissions respectively. A further increase in the heating pulse width to 40 seconds leads to lower emissions conversion performance. This can be attributed to the catalyst's light-out during the extended heating off period.

Considering the peaks in the DOC's inlet and outlet temperature profiles, it can be concluded that approximately 21 seconds are required for the heat wave to travel through the catalyst.

In other words, the DOC's outlet temperature profile's phase is delayed by 21 seconds with respect to the DOC's inlet temperature profile in these conditions. It should be noted that this parameter can be affected by other factors (e.g. catalyst geometry and exhaust flow rate).

In order to further investigate the pulsating heating effect on the catalyst's behaviour, a computational model was developed in the Axisuite software based on the experimental specifications and data. For model calibration purposes, the EHC's heating power was assumed to be 4% lower in the model compared to the experimental conditions due to electrical energy losses in the EHC's wiring. FIG. 13 shows that acceptable consistency was found for the model temperature profiles validation; however, the model tends to slightly overestimate the DOC's outlet temperature fluctuations. This can be associated with a higher heat loss in the experimental study.

Figure 14:
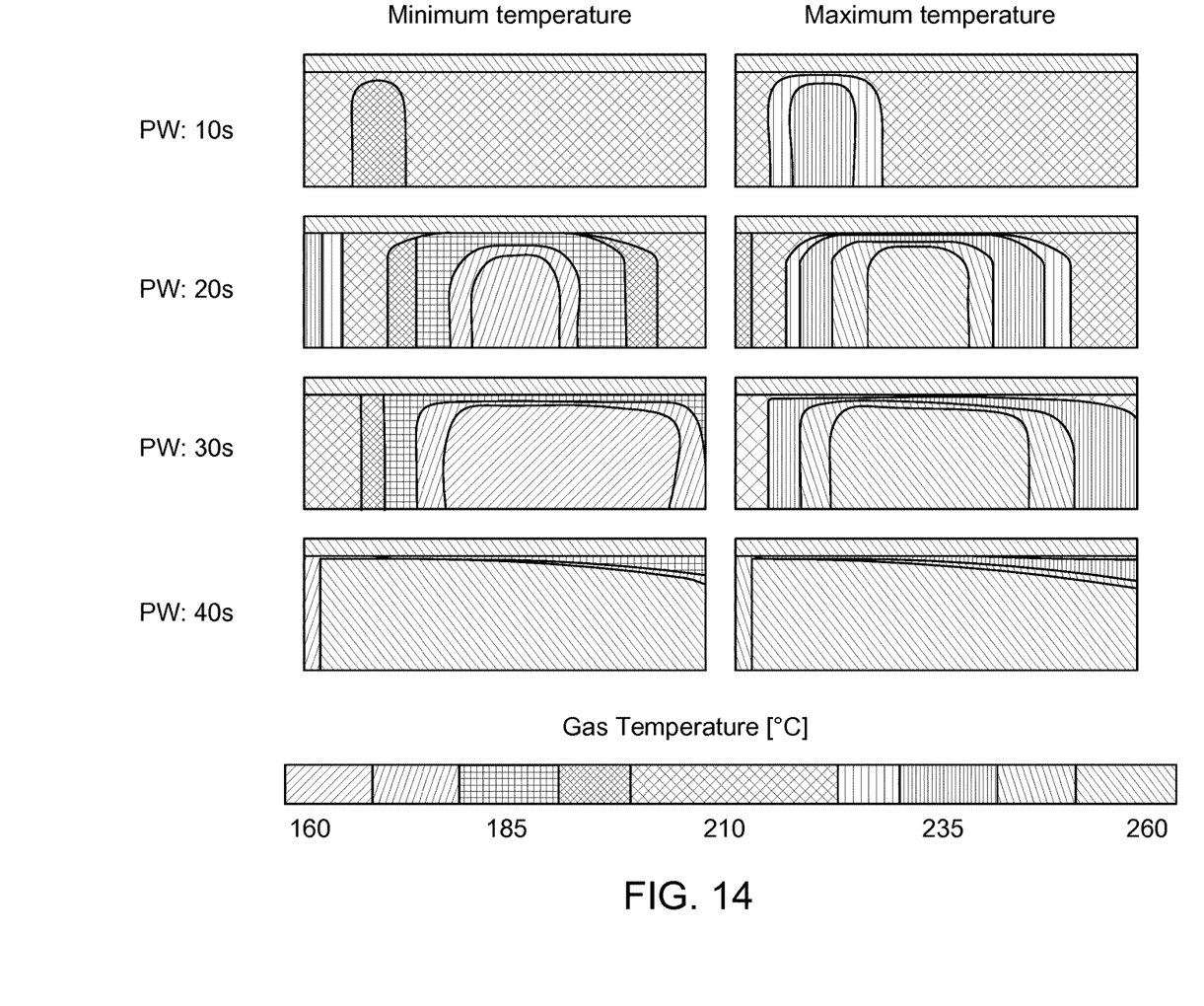
FIG. 14 is a series of graphs depicting the effect of different first phase timings (at 885 W) on the temperature contours of a diesel oxidation catalyst.

As illustrated in FIG. 14, the DOC's temperature contours for different heating pulse widths or duration were examined during minimum and maximum temperature periods. Relatively homogenous temperature contours were observed in the case of the P-EHC with 10 seconds pulse width or duration. The slight temperature fluctuations caused by the pulsating EHC at the catalyst's inlet tend to decrease considerably over the catalyst's length in this case.

Results show that increasing the heating pulse width results in forming a hot spot with a higher temperature and larger size that travels through the catalyst. This hot spot is followed by a cold spot during the minimum temperature periods. For the case with 40 seconds heating pulse width, this cold spot can occupy the majority of the catalyst's volume and reduces the emissions reduction performance. Therefore this study reveals the importance of the heating control strategy in order to maximize the electrical catalyst heating efficiency on a driving cycle.

The invention claimed is:

1. An exhaust gas treatment system for removing pollutants from an exhaust gas stream of a combustion engine to form a converted gas stream, the system comprising:
   a catalytic converter with a gas inlet for the exhaust gas stream and a gas outlet for the converted gas stream, a catalytic reaction of the catalytic converter having a higher efficiency above a first temperature than below a second temperature which is lower than the first temperature, wherein the second temperature is equal to or less than a light-out temperature of the catalytic converter;
   a heat source for increasing a temperature of the catalytic converter;
   a control unit for controlling the heat source such that a sub-volume of the catalytic converter is above the first temperature, thereby creating a hot volume having a higher conversion efficiency than a remaining cooler volume of the catalytic converter;
   the control unit being configured to:
      in a first phase of a heating cycle, control the heat source such that the hot volume extends from the gas inlet of the catalytic converter in a direction of the exhaust gas stream; and
      in a second phase of the heating cycle, control the heat source such that a temperature of the gas inlet of the catalytic converter is reduced below the second temperature, allowing the hot volume to travel towards the gas outlet of the catalytic converter and a cooler volume to extend from the gas inlet of the catalytic converter in the direction of the exhaust gas stream.

2. The exhaust gas treatment system of claim 1, wherein the first and second phase are timed such that as the hot volume travels towards the gas outlet of the catalytic converter, a total conversion efficiency of the hot and cold volume of the catalytic converter is such that the exhaust gas stream is converted to a converted gas stream with a required reduction of pollutants.

3. The exhaust gas treatment system of claim 1, wherein the hot volume travels substantially a full length of the catalytic converter.

4. The exhaust gas treatment of claim 1, wherein the heating cycle is repeated.

5. The exhaust gas treatment system of claim 1, wherein a plurality of hot volumes exists along a length of the catalytic converter at any one time, separated by intervening cooler volumes.

6. The exhaust gas treatment system of claim 1, wherein the converted gas stream is 90% free from pollutants.

7. The exhaust gas treatment system of claim 1, wherein the first temperature is equal to or greater than the light-off temperature of the catalytic converter.

8. The exhaust gas treatment system of claim 1, wherein the controller calculates a timing of the first and second phase taking into account heat generated by the exothermic conversion reaction of the exhaust gas stream into the converted gas stream, thereby enabling heat input to be reduced.

9. The exhaust gas treatment system of claim 1, wherein the controller calculates a timing of the first and second phase taking into account hysteresis in a relationship between conversion efficiency and temperature of the catalytic converter, thereby enabling heat input to be reduced.

10. The exhaust gas treatment system of claim 1, wherein the controller uses pre-defined values for a duration of the first phase, a temperature level to be achieved in the first phase, a duration of the second phase, and a temperature level to be achieved in the second phase.

11. The exhaust gas treatment system of claim 10, wherein the pre-defined values are determined as a function of at least a temperature of the exhaust gas, or an actual power output of the combustion engine.

12. The exhaust gas treatment system of claim 10, wherein the predefined values are determined based on an expected change in power output of the combustion engine.

13. The exhaust gas treatment system of claim 12, wherein the expected change of the power output of the combustion engine is derived from position data or advanced driver assistance systems.

14. The exhaust gas treatment system of claim 10, wherein the predefined values are determined based on one or more of a temperature of the exhaust gas, a temperature of the catalytic converter and a flow rate of the exhaust gas through the catalytic converter.

15. The exhaust gas treatment system of claim 1, wherein the heater is powered by a generator within a hybrid electric vehicle.

16. A vehicle comprising the exhaust gas treatment system of claim 1.

17. A method of heating a catalytic converter having a gas inlet for an exhaust gas stream and a gas outlet for a converted gas stream formed by removing pollutants from the exhaust gas stream, the method comprising:
   in a first phase, supplying heat at a first level for a first amount of time to a catalytic converter such that a sub-volume of the catalytic converter is heated above a first temperature above which a catalytic reaction is of a higher efficiency than below a second temperature which is lower than the first temperature, wherein the second temperature is equal to or less than a light-out temperature of the catalytic converter, the sub-volume extending from the gas inlet of the catalytic converter in a direction of the exhaust gas stream thereby defining a hot volume having a higher conversion efficiency than a remaining cooler volume of the catalytic converter; and
   in a second phase, supplying heat at a second level for a second amount of time to the catalytic converter such that a temperature of the gas inlet of the catalytic converter is reduced below the second temperature, so as to allow the hot volume to travel towards the gas outlet of the catalytic converter and a cooler volume to extend from the gas inlet of the catalytic converter in the direction of the exhaust gas stream.

18. The method of claim 17, wherein the first and second phase are timed such that as the hot volume travels towards the gas outlet of the catalytic converter, a total conversion efficiency of the hot and cold volume of the catalytic converter is such that the exhaust gas stream is converted to a converted gas stream with a required reduction of pollutants.

19. A non-transitory computer readable medium having instructions stored thereon that when executed by a controller, causes the controller to perform the method of claim 17.

20. A control unit configured to carry out the steps of method claim 17.

* * * * *